(12) United States Patent
Iwabuchi

(10) Patent No.: US 10,533,087 B2
(45) Date of Patent: Jan. 14, 2020

(54) VINYL CHLORIDE RESIN COMPOSITION FOR POWDER MOLDING AND METHOD FOR PRODUCING THE SAME, VINYL CHLORIDE RESIN MOLDED PRODUCT AND METHOD FOR PRODUCING THE SAME, AND LAMINATE

(71) Applicant: ZEON CORPORATION, Chiyoda-ku, Tokyo (JP)

(72) Inventor: Satoshi Iwabuchi, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/520,960

(22) PCT Filed: Nov. 4, 2015

(86) PCT No.: PCT/JP2015/005532
§ 371 (c)(1),
(2) Date: Apr. 21, 2017

(87) PCT Pub. No.: WO2016/075902
PCT Pub. Date: May 19, 2016

(65) Prior Publication Data
US 2017/0342256 A1 Nov. 30, 2017

(30) Foreign Application Priority Data
Nov. 11, 2014 (JP) ................................. 2014-228592

(51) Int. Cl.
| | | |
|---|---|---|
| *C08L 27/06* | (2006.01) |
| *B32B 5/18* | (2006.01) |
| *B29C 41/18* | (2006.01) |
| *B32B 27/20* | (2006.01) |
| *B32B 27/40* | (2006.01) |
| *B32B 27/30* | (2006.01) |
| *C08K 5/20* | (2006.01) |

(52) U.S. Cl.
CPC .............. *C08L 27/06* (2013.01); *B29C 41/18* (2013.01); *B32B 5/18* (2013.01); *B32B 27/20* (2013.01); *B32B 27/304* (2013.01); *B32B 27/40* (2013.01); *C08K 5/20* (2013.01)

(58) Field of Classification Search
CPC ...................................................... C08L 27/06
See application file for complete search history.

(56) References Cited

U.S. PATENT DOCUMENTS

2013/0089728 A1* 4/2013 Kobayashi ............ B32B 27/304
428/319.3

FOREIGN PATENT DOCUMENTS

| EP | 0189899 A2 | 8/1986 |
| EP | 0487124 A1 | 5/1992 |
| JP | S61174270 A | 8/1986 |
| JP | H01156357 A | 6/1989 |
| JP | H08291243 A | 11/1996 |
| JP | H08291244 A | 11/1996 |
| JP | 2000256525 A | 9/2000 |

OTHER PUBLICATIONS

May 16, 2017, International Preliminary Report on Patentability issued in the International Patent Application No. PCT/JP2015/005532.
Apr. 20, 2018, Extended European Search Report issued by the European Patent Office in the corresponding European Patent Application No. 15859613.0.
Database CA [Online] Chemical Abstracts Service, Columbus, Ohio, US; "Ink-resistant plasticized poly (vinyl chloride) sheets", XP002779879, retrieved from STN Database accession No. 1985:150545, 1985.
Database CA [Online] Chemical Abstracts Service, Columbus, Ohio, US; "PVC films for agriculture", XP002779880, retrieved from STN Database accession No. 1984:8031, 1984.
Database CA [Online] Chemical Abstracts Service, Columbus, Ohio, US; Sasaki, Masao et al: "Antiblocking vinyl chloride resin films for agricultural uses", XP002779878, retrieved from STN Database accession No. 1993:519205, 1993.
Database CA [Online] Chemical Abstracts Service, Columbus, Ohio, US; Masuda, Toshio et al: "Low-friction vinyl chloride-based resin powder molding compositions with good adhesion to foamed polyurethanes and their laminates", XP002779875, retrieved from STN Database accession No. 1997:72112, 1997.
Database CA [Online] Chemical Abstracts Service, Columbus, Ohio, US; Ning, Jianhua et al: "Environment-friendly and low-temperature-resistant PVC modified material and preparation method thereof", XP002779876, retrieved from STN Database accession No. 2013:648724, 2013.
Feb. 2, 2016, International Search Report issued in the International Patent Application No. PCT/JP2015/005532.
Jan. 30, 2019, Communication pursuant to Article 94(3) EPC issued by the European Patent Office in the corresponding European Patent Application No. 15859613.0.
Sep. 10, 2019, Summons to attend oral proceedings pursuant to Rule 115(1) EPC issued by the European Patent Office in the corresponding European Patent Application No. 15859613.0.

* cited by examiner

*Primary Examiner* — Arrie L Reuther
(74) *Attorney, Agent, or Firm* — Kenja IP Law PC

(57) ABSTRACT

Provided is a vinyl chloride resin composition for powder molding that has excellent meltability in heat forming and high adhesiveness to a foamed polyurethane molded product after heat forming. The vinyl chloride resin composition for powder molding contains vinyl chloride resin particles (a), a plasticizer (b), a fatty acid amide (c), and vinyl chloride resin fine particles (d). The fatty acid amide (c) has a melting point of at least 105° C. and a content of at least 0.15 parts by mass and no greater than 13 parts by mass relative to a total content of 100 parts by mass of the vinyl chloride resin particles (a) and the vinyl chloride resin fine particles (d).

12 Claims, No Drawings

VINYL CHLORIDE RESIN COMPOSITION FOR POWDER MOLDING AND METHOD FOR PRODUCING THE SAME, VINYL CHLORIDE RESIN MOLDED PRODUCT AND METHOD FOR PRODUCING THE SAME, AND LAMINATE

TECHNICAL FIELD

This disclosure relates to a vinyl chloride resin composition for powder molding that has excellent meltability in heat forming and high adhesiveness to a foamed polyurethane molded product after heat forming, a vinyl chloride resin molded product obtained through powder molding of the vinyl chloride resin composition for powder molding, a laminate including the vinyl chloride resin molded product and a foamed polyurethane molded product, a method for producing the vinyl chloride resin composition for powder molding, and a method for producing the vinyl chloride resin molded product.

BACKGROUND

An automobile instrument panel has a structure in which a foamed polyurethane layer is disposed between a substrate and a surface skin formed from a resin. In a situation in which the surface skin is formed from a vinyl chloride resin, an amine-based compound in the foamed polyurethane causes degradation and deterioration of the surface skin. Moreover, a squeaking noise may occur when the surface skin formed from a vinyl chloride resin rubs against another interior material in contact therewith. A vinyl chloride-based resin-containing vinyl chloride-based resin composition for powder molding that is obtained through dry blending of perchloric acid-treated hydrotalcite, an alkali metal aluminosilicate and/or alkaline earth metal aluminosilicate having a zeolite crystal structure, a fatty acid amide, and a plasticizer has been investigated with an objective of obtaining a vinyl chloride resin molded product having excellent amine resistance and low squeaking (for example, refer to PTL 1).

Furthermore, a vinyl chloride-based resin composition for powder molding containing a vinyl chloride-based resin, a fatty acid amide, an organopolysiloxane, and a plasticizer has been investigated with an objective of obtaining a vinyl chloride resin molded product having high adhesiveness to foamed polyurethane and low squeaking (for example, refer to PTL 2).

CITATION LIST

Patent Literature

PTL 1: JP 2000-256525 A
PTL 2: JP H8-291243 A

SUMMARY

Technical Problem

In recent years, there has been demand for a vinyl chloride resin composition for powder molding that has excellent meltability in heat forming and high adhesiveness to a foamed polyurethane molded product after heat forming. However, it has not been possible to obtain such a vinyl chloride resin composition for powder molding.

Accordingly, one problem that this disclosure aims to solve is provision of a vinyl chloride resin composition for powder molding having excellent meltability in heat forming and high adhesiveness to a foamed polyurethane molded product after heat forming. Another problem that this disclosure aims to solve is provision of a vinyl chloride resin molded product obtained through powder molding of the aforementioned vinyl chloride resin composition for powder molding and a laminate including this vinyl chloride resin molded product and a foamed polyurethane molded product. Yet another problem that this disclosure aims to solve is provision of a method for producing the aforementioned vinyl chloride resin composition for powder molding and a method for producing the aforementioned vinyl chloride resin molded product.

Solution to Problem

As a result of diligent investigation conducted with the aim of solving the problems set forth above, the inventor discovered that a vinyl chloride resin composition for powder molding that contains vinyl chloride resin particles (a), a plasticizer (b), a prescribed amount of a specific fatty acid amide (c), and vinyl chloride resin fine particles (d), has excellent meltability in heat forming and high adhesiveness to a foamed polyurethane molded product after heat forming. This discovery led to the present disclosure.

A presently disclosed vinyl chloride resin composition for powder molding contains vinyl chloride resin particles (a), a plasticizer (b), a fatty acid amide (c), and vinyl chloride resin fine particles (d), wherein the fatty acid amide (c) has a melting point of at least 105° C. and a content of at least 0.15 parts by mass and no greater than 13 parts by mass relative to a total content of 100 parts by mass of the vinyl chloride resin particles (a) and the vinyl chloride resin fine particles (d).

Herein, the term "resin particles" is used to refer to particles having a particle diameter of at least 30 μm and the term "resin fine particles" is used to refer to particles having a particle diameter of less than 30 μm.

In the presently disclosed vinyl chloride resin composition for powder molding, the fatty acid amide (c) preferably has an average particle diameter of less than 20 μm.

In the presently disclosed vinyl chloride resin composition for powder molding, the fatty acid amide (c) preferably has a dimer or higher structure.

In the presently disclosed vinyl chloride resin composition for powder molding, the vinyl chloride resin particles (a) preferably have an average particle diameter of at least 50 μm and no greater than 500 μm.

In the presently disclosed vinyl chloride resin composition for powder molding, the vinyl chloride resin fine particles (d) preferably have an average particle diameter of at least 0.1 μm and no greater than 10 μm.

The presently disclosed vinyl chloride resin composition for powder molding is preferably used in powder slush molding.

A presently disclosed vinyl chloride resin molded product is obtained through powder slush molding of any one of the vinyl chloride resin compositions for powder molding described above.

The presently disclosed vinyl chloride resin molded product is preferably for a surface skin of an automobile instrument panel.

A presently disclosed laminate includes a foamed polyurethane molded product and any one of the vinyl chloride resin molded products described above.

The presently disclosed laminate is preferably for an automobile instrument panel.

A presently disclosed method for producing any one of the vinyl chloride resin compositions for powder molding described above includes mixing the vinyl chloride resin particles (a), the plasticizer (b), the fatty acid amide (c), and the vinyl chloride resin fine particles (d).

A presently disclosed method for producing a vinyl chloride resin molded product includes powder slush molding any one of the vinyl chloride resin compositions for powder molding described above or a vinyl chloride resin composition for powder molding produced according to the method described above.

Advantageous Effect

The presently disclosed vinyl chloride resin composition for powder molding has excellent meltability in heat forming and high adhesiveness to a foamed polyurethane molded product after heat forming.

DETAILED DESCRIPTION (Vinyl Chloride Resin Composition for Powder Molding)

The presently disclosed vinyl chloride resin composition for powder molding contains vinyl chloride resin particles (a), a plasticizer (b), a fatty acid amide (c), and vinyl chloride resin fine particles (d), and may optionally further contain additives.

<Vinyl Chloride Resin>

Examples of vinyl chloride resins that may form the vinyl chloride resin particles (a) and the vinyl chloride resin fine particles (d) include homopolymers of vinyl chloride and copolymers containing vinyl chloride units in a proportion of preferably at least 50 mass %, and more preferably at least 70 mass %. Specific examples of comonomers of vinyl chloride copolymers include: olefins such as ethylene and propylene; halogenated olefins such as allyl chloride, vinylidene chloride, vinyl fluoride, and trifluorochloroethylene; carboxylic acid vinyl esters such as vinyl acetate and vinyl propionate; vinyl ethers such as isobutyl vinyl ether and cetyl vinyl ether; allyl ethers such as allyl-3-chloro-2-oxypropyl ether and allyl glycidyl ether; unsaturated carboxylic acids, esters of unsaturated carboxylic acids, and acid anhydrides of unsaturated carboxylic acids such as acrylic acid, maleic acid, itaconic acid, acrylic acid-2-hydroxyethyl, methyl methacrylate, monomethyl maleate, diethyl maleate, and maleic anhydride; unsaturated nitriles such as acrylonitrile and methacrylonitrile; acrylamides such as acrylamide, N-methylolacrylamide, acrylamido-2-methylpropane sulfonic acid, and (meth)acrylamidopropyltrimethylammonium chloride; and allyl amines and derivatives thereof such as allylamine benzoate and diallyldimethylammonium chloride. The above examples of monomers are merely some of the monomers (comonomers) that are copolymerizable with vinyl chloride. Further examples of various types of monomers that can be used as comonomers are provided in pages 75 to 104 of "Polyvinyl chloride" edited by the Vinyl Section of the Kinki Chemical Society Japan and published by Nikkan Kogyo Shimbun, Ltd. (1988). Any one of these monomers or any two or more of these monomers may be used. Examples of vinyl chloride resins that may form the vinyl chloride resin particles (a) and the vinyl chloride resin fine particles (d) also include resins formed by graft polymerization of (1) vinyl chloride or (2) vinyl chloride and a comonomer such as described above with a resin such as an ethylene-vinyl acetate copolymer, an ethylene-methyl methacrylate copolymer, an ethylene-ethyl acrylate copolymer, or a chlorinated polyethylene.

The present description uses the term "(meth)acryl" to refer to either or both of acryl and methacryl.

Conventionally known production methods such as suspension polymerization, emulsion polymerization, solution polymerization, and bulk polymerization can be used to produce the vinyl chloride resin.

In the vinyl chloride resin composition for powder molding, the vinyl chloride resin particles (a) function as a matrix resin. The vinyl chloride resin fine particles (d) function as a dusting agent (powder fluidity modifier) described further below.

<Vinyl Chloride Resin Particles (a)>

The average particle diameter of the vinyl chloride resin particles (a) is preferably at least 50 μm and no greater than 500 μm, more preferably at least 50 μm and no greater than 250 μm, and even more preferably at least 100 μm and no greater than 200 μm. As a result of the average particle diameter of the vinyl chloride resin particles (a) being within any of the ranges set forth above, powder fluidity of the vinyl chloride resin composition becomes favorable and smoothness of a vinyl chloride resin molded product obtained through powder molding of the vinyl chloride resin composition can be improved.

Herein, the term "average particle diameter" refers to the volume average particle diameter measured in accordance with JIS Z8825 by, for example, a laser diffraction method.

The average degree of polymerization of a vinyl chloride resin forming the vinyl chloride resin particles (a) is preferably at least 800 and no greater than 5,000, and more preferably at least 800 and no greater than 3,000. As a result of the average degree of polymerization of the vinyl chloride resin forming the vinyl chloride resin particles (a) being within any of the ranges set forth above, a vinyl chloride resin molded product obtained through powder molding of the vinyl chloride resin composition can be provided with good heat aging resistance.

The average degree of polymerization is measured in accordance with JIS K6720-2.

<Vinyl Chloride Resin Fine Particles (d)>

The presently disclosed vinyl chloride resin composition for powder molding contains vinyl chloride resin fine particles (d) in addition to the vinyl chloride resin particles (a). The vinyl chloride resin fine particles (d) function as a dusting agent for improving powder fluidity of the vinyl chloride resin composition for powder molding.

The average particle diameter of the vinyl chloride resin fine particles (d) is preferably at least 0.1 μm and no greater than 10 μm. As a result of the average particle diameter of the vinyl chloride resin fine particles (d) being within the range set forth above, powder fluidity of the vinyl chloride resin composition for powder molding can be improved.

Herein, the term "average particle diameter" refers to the volume average particle diameter measured in accordance with JIS Z8825 by, for example, a laser diffraction method.

The average degree of polymerization of a vinyl chloride resin forming the vinyl chloride resin fine particles (d) is preferably at least 500 and no greater than 5,000, more preferably at least 600 and no greater than 3,000, and even more preferably at least 700 and no greater than 2,500. As a result of the average degree of polymerization of the vinyl chloride resin forming the vinyl chloride resin fine particles (d) being within any of the ranges set forth above, the vinyl chloride resin composition for powder molding can be provided with good powder fluidity. Moreover, meltability of the vinyl chloride resin composition for powder molding in heat forming and adhesiveness of the vinyl chloride resin composition for powder molding to a foamed polyurethane molded product after heat forming can be improved.

The content of the vinyl chloride resin fine particles (d) relative to the total content (100 mass %) of the vinyl chloride resin particles (a) and the vinyl chloride resin fine particles (d) is preferably at least 5 mass % and no greater than 35 mass %, more preferably at least 5 mass % and no greater than 30 mass %, and even more preferably at least 5 mass % and no greater than 25 mass %. As a result of the content of the vinyl chloride resin fine particles (d) being within any of the ranges set forth above, the vinyl chloride resin composition for powder molding can be provided with good powder fluidity. Moreover, meltability of the vinyl chloride resin composition for powder molding in heat forming and adhesiveness of the vinyl chloride resin composition for powder molding to a foamed polyurethane molded product after heat forming can be improved.

<Plasticizer>

The plasticizer (b) contained in the presently disclosed vinyl chloride resin composition for powder molding is preferably a trimellitate plasticizer. The trimellitate plasticizer is an ester compound of trimellitic acid and a monohydric alcohol.

Specific examples of the monohydric alcohol include, but are not specifically limited to, 1-hexanol, 1-heptanol, 1-octanol, 2-ethylhexanol, 1-nonanol, 1-decanol, 1-undecanol, and 1-dodecanol.

Moreover, the trimellitate plasticizer used as the plasticizer (b) is preferably a triester compound in which substantially all the carboxy groups of trimellitic acid are esterified with the monohydric alcohol. Alcohol residue portions of the triester compound may all be derived from the same alcohol or may each be derived from a different alcohol.

The trimellitate plasticizer may be one compound used individually or a mixture of different compounds.

Specific examples of suitable trimellitate plasticizers include tri-n-hexyl trimellitate, tri-n-heptyl trimellitate, tri-n-octyl trimellitate, tri(2-ethylhexyl) trimellitate, tri-n-nonyl trimellitate, tri-n-decyl trimellitate, triisodecyl trimellitate, tri-n-undecyl trimellitate, tri-n-dodecyl trimellitate, tri-n-alkyl trimellitates (esters including two or more types of alkyl groups having differing carbon numbers of 6 to 12 in molecules thereof), trialkyl trimellitates (esters including two or more types of alkyl groups having differing carbon numbers of 8 to 10 in molecules thereof), and mixtures of any of the preceding examples.

Specific examples of more preferable trimellitate plasticizers include tri-n-octyl trimellitate, tri(2-ethylhexyl) trimellitate, tri-n-nonyl trimellitate, tri-n-decyl trimellitate, tri-n-alkyl trimellitates (esters including two or more types of alkyl groups having differing carbon numbers of 8 to 10 in molecules thereof), and mixtures of any of the preceding examples.

Examples of plasticizers other than trimellitate plasticizers that can be used as the plasticizer (b) contained in the presently disclosed vinyl chloride resin composition for powder molding include primary plasticizers and secondary plasticizers such as listed below.

Examples of so-called primary plasticizers include:

pyromellitate plasticizers such as tetra-n-hexyl pyromellitate, tetra-n-heptyl pyromellitate, tetra-n-octyl pyromellitate, tetra(2-ethylhexyl) pyromellitate, tetra-n-nonyl pyromellitate, tetra-n-decyl pyromellitate, tetraisodecyl pyromellitate, tetra-n-undecyl pyromellitate, tetra-n-dodecyl pyromellitate, and tetra-n-alkyl pyromellitates (esters including two or more types of alkyl groups having differing carbon numbers of 6 to 12 in molecules thereof);

phthalic acid derivatives such as dimethyl phthalate, diethyl phthalate, dibutyl phthalate, di(2-ethylhexyl) phthalate, di-n-octyl phthalate, diisobutyl phthalate, diheptyl phthalate, diphenyl phthalate, diisodecyl phthalate, ditridecyl phthalate, diundecyl phthalate, dibenzyl phthalate, butyl benzyl phthalate, dinonyl phthalate, and dicyclohexyl phthalate;

isophthalic acid derivatives such as dimethyl isophthalate, di(2-ethylhexyl) isophthalate, and diisooctyl isophthalate;

tetrahydrophthalic acid derivatives such as di(2-ethylhexyl) tetrahydrophthalate, di-n-octyl tetrahydrophthalate, and diisodecyl tetrahydrophthalate;

adipic acid derivatives such as di-n-butyl adipate, di(2-ethylhexyl) adipate, diisodecyl adipate, and diisononyl adipate;

azelaic acid derivatives such as di(2-ethylhexyl) azelate, diisooctyl azelate, and di-n-hexyl azelate;

sebacic acid derivatives such as di-n-butyl sebacate, di(2-ethylhexyl) sebacate, diisodecyl sebacate, and di(2-butyloctyl) sebacate;

maleic acid derivatives such as di-n-butyl maleate, dimethyl maleate, diethyl maleate, and di(2-ethylhexyl) maleate;

fumaric acid derivatives such as di-n-butyl fumarate and di(2-ethylhexyl) fumarate;

citric acid derivatives such as triethyl citrate, tri-n-butyl citrate, acetyl triethyl citrate, and acetyl tri(2-ethylhexyl) citrate;

itaconic acid derivatives such as monomethyl itaconate, monobutyl itaconate, dimethyl itaconate, diethyl itaconate, dibutyl itaconate, and di(2-ethylhexyl) itaconate;

oleic acid derivatives such as butyl oleate, glyceryl monooleate, and diethylene glycol monooleate;

ricinoleic acid derivatives such as methyl acetyl ricinoleate, butyl acetyl ricinoleate, glyceryl monoricinoleate, and diethylene glycol monoricinoleate;

stearic acid derivatives such as n-butyl stearate and diethylene glycol distearate;

other fatty acid derivatives such as diethylene glycol monolaurate, diethylene glycol dipelargonate, and pentaerythritol fatty acid esters;

phosphoric acid derivatives such as triethyl phosphate, tributyl phosphate, tri(2-ethylhexyl) phosphate, tributoxyethyl phosphate, triphenyl phosphate, cresyl diphenyl phosphate, tricresyl phosphate, trixylenyl phosphate, and tris(chloroethyl) phosphate;

glycol derivatives such as diethylene glycol dibenzoate, dipropylene glycol dibenzoate, triethylene glycol dibenzoate, triethylene glycol di(2-ethylbutyrate), triethylene glycol di(2-ethylhexanoate), and dibutyl methylenebisthioglycolate;

glycerin derivatives such as glycerol monoacetate, glycerol triacetate, and glycerol tributyrate;

epoxy derivatives such as epoxy hexahydro diisodecyl phthalate, epoxy triglyceride, epoxidized octyl oleate, and epoxidized decyl oleate; and polyester plasticizers such as adipic acid polyesters, sebacic acid polyesters, and phthalic acid polyesters.

Examples of so-called secondary plasticizers include epoxidized vegetable oils such as epoxidized soybean oil and epoxidized linseed oil; chlorinated paraffin; fatty acid esters of glycol such as triethylene glycol dicaprylate; butyl epoxy stearate; phenyl oleate; and methyl dihydroabietate.

Among these plasticizers other than trimellitate plasticizers, pyromellitate plasticizers are preferable, and tetra(2-ethylhexyl) pyromellitate is more preferable.

Any one or any two or more of these other plasticizers may be used in the presently disclosed vinyl chloride resin composition for powder molding. In a situation in which a secondary plasticizer is used, a primary plasticizer of equivalent or greater mass is preferably used in combination with the secondary plasticizer.

The total content of the plasticizer (b) relative to a total content of 100 parts by mass of the vinyl chloride resin particles (a) and the vinyl chloride resin fine particles (d) is preferably at least 5 parts by mass and no greater than 200 parts by mass, more preferably at least 30 parts by mass and no greater than 180 parts by mass, and even more preferably at least 50 parts by mass and no greater than 150 parts by mass. As a result of the content of the plasticizer (b) being within any of the ranges set forth above, a vinyl chloride resin molded product obtained through powder molding of the vinyl chloride resin composition can be provided with good flexibility at low temperatures.

<Fatty Acid Amide (c)>

The fatty acid amide (c) contained in the presently disclosed vinyl chloride resin composition for powder molding is required to have a melting point of at least 105° C. The melting point of the fatty acid amide (c) is preferably at least 120° C. and no greater than 200° C., more preferably at least 130° C. and no greater than 180° C., and even more preferably at least 140° C. and no greater than 160° C.

The presently disclosed vinyl chloride resin composition for powder molding is required to contain at least 0.15 parts by mass and no greater than 13 parts by mass of the fatty acid amide (c) relative to a total content of 100 parts by mass of the vinyl chloride resin particles (a) and the vinyl chloride resin fine particles (d). The content of the fatty acid amide (c) relative to a total content of 100 parts by mass of the vinyl chloride resin particles (a) and the vinyl chloride resin fine particles (d) is preferably at least 0.5 parts by mass and no greater than 10 parts by mass, and more preferably at least 3 parts by mass and no greater than 10 parts by mass. As a result of the content of the fatty acid amide (c) being within any of the ranges set forth above, meltability of the vinyl chloride resin composition for powder molding in heat forming and adhesiveness of the vinyl chloride resin composition for powder molding to a foamed polyurethane molded product after heat forming can be improved.

The average particle diameter of the fatty acid amide (c) is preferably less than 20 μm, more preferably no greater than 15 μm, and even more preferably no greater than 10 μm. As a result of the average particle diameter of the fatty acid amide (c) being within any of the ranges set forth above, meltability of the vinyl chloride resin composition for powder molding in heat forming and adhesiveness of the vinyl chloride resin composition for powder molding to a foamed polyurethane molded product after heat forming can be improved. It is preferable from a viewpoint of handleability that the average particle diameter of the fatty acid amide (c) is at least 0.1 μm.

The fatty acid amide (c) preferably has a dimer or higher structure.

Examples of the fatty acid amide (c) having a melting point of at least 105° C. include the following amides, saturated fatty acid bisamides, and unsaturated fatty acid bisamides.

Examples of amides that can be used include saturated fatty acid amides such as lauramide, palmitamide, stearamide, purified stearamide, high-purity behenamide, and hydroxystearamide; unsaturated fatty acid amides such as purified oleamide and purified erucamide; substituted amides such as N-oleyl palmitamide, N-stearyl stearamide, N-stearyl oleamide, N-oleyl stearamide, and N-stearyl erucamide; and methylol amides such as methylol stearamide.

Examples of saturated fatty acid bisamides that can be used include methylene bisstearamide, ethylene bishydroxystearamide, ethylene biscapramide, ethylene bislauramide, ethylene bisstearamide, ethylene bisisostearamide, ethylene bisbehenamide, hexamethylene bisstearamide, hexamethylene bisbehenamide, hexamethylene bishydroxystearamide, N,N'-distearyl adipamide, and N,N'-distearyl sebacamide.

Examples of unsaturated fatty acid bisamides that can be used include ethylene bisoleamide, ethylene biserucamide, hexamethylene bisoleamide, N,N'-dioleyl adipamide, and N,N'-dioleyl sebacamide.

Among the examples listed above, saturated fatty acid bisamides such as methylene bisstearamide and ethylene bisstearamide are preferable as the fatty acid amide (c) having a melting point of at least 105° C. Examples of preferable products that can be used include SLIPACKS EK produced by Nippon Kasei Chemical Co., Ltd., SLIPACKS E fine powder produced by Nippon Kasei Chemical Co., Ltd., and CERAFLOUR 960 produced by BYK Japan KK, of which, SLIPACKS EK produced by Nippon Kasei Chemical Co., Ltd. and CERAFLOUR 960 produced by BYK Japan KK are more preferable.

<Additives>

[Perchloric Acid-Treated Hydrotalcite]

The presently disclosed vinyl chloride resin composition for powder molding may contain perchloric acid-treated hydrotalcite. The perchloric acid-treated hydrotalcite can be easily produced by, for example, addition and stirring of hydrotalcite with a dilute aqueous solution of perchloric acid, followed by filtration, dehydration, or drying as necessary. Through this process, at least some of the carbonate anions ($CO_3^{2-}$) in the hydrotalcite are substituted with perchlorate anions ($ClO_4^-$) (note that 2 mol of perchlorate anions are substituted per 1 mol of carbonate anions). The molar ratio of hydrotalcite and perchloric acid may be freely set, although a ratio of 0.1 mol to 2 mol of perchloric acid relative to 1 mol of hydrotalcite is typical.

The substitution ratio of carbonate anions in the untreated (unsubstituted) hydrotalcite by perchlorate anions is preferably at least 50 mol %, more preferably at least 70 mol %, and even more preferably at least 85 mol %. Moreover, the substitution ratio of carbonate anions in the untreated (unsubstituted) hydrotalcite by perchlorate anions is preferably no greater than 95 mol %. As a result of the substitution ratio of carbonate anions in the untreated (unsubstituted) hydrotalcite by perchlorate anions being within any of the ranges set forth above, a vinyl chloride resin molded product obtained through powder molding of the vinyl chloride resin composition for powder molding can be provided with good flexibility at low temperatures.

Hydrotalcite is a non-stoichiometric compound represented by a general formula: $[Mg_{1-x}Al_x(OH)_2]^{x+}[(CO_3)_{x/2} \cdot mH_2O]^{x-}$, and is an inorganic substance having a layered crystal structure formed by a positively charged basic layer of $[Mg_{1-x}Al_x(OH)_2]^{x+}$ and a negatively charged intermediate layer of $[(CO_3)_{x/2} \cdot mH_2O]^{x-}$. In the general formula shown above, x represents a number that is greater than 0 and no greater than 0.33. Natural hydrotalcite is represented by $Mg_6Al_2(OH)_{16}CO_3 \cdot 4H_2O$. On the other hand, a synthetic hydrotalcite represented by $Mg_{4.5}Al_2(OH)_{13}CO_3 \cdot 3.5H_2O$ is commercially available. Synthetic hydrotalcite can for example be synthesized by a method described in JP S61-174270 A.

The content of the perchloric acid-treated hydrotalcite relative to a total content of 100 parts by mass of the vinyl chloride resin particles (a) and the vinyl chloride resin fine particles (d) is preferably at least 0.5 parts by mass and no greater than 7 parts by mass, more preferably at least 1 part by mass and no greater than 6 parts by mass, and even more preferably at least 1.5 parts by mass and no greater than 5.5 parts by mass. As a result of the content of the perchloric acid-treated hydrotalcite being within any of the ranges set forth above, the vinyl chloride resin composition for powder molding can be provided with good flexibility at low temperatures.

[Zeolite]

The presently disclosed vinyl chloride resin composition for powder molding may contain a zeolite as a stabilizer. A zeolite is a compound represented by a general formula: $M_{x/n}\cdot[(AlO_2)_x\cdot(SiO_2)_y]\cdot zH_2O$ (in the general formula, M is a metal ion of valency n, x+y is the number of tetrahedra per unit cell, and z is the number of moles of water). Examples of M in the general formula include monovalent and divalent metals such as Na, Li, Ca, Mg, and Zn, and mixtures thereof.

The content of the zeolite relative to a total content of 100 parts by mass of the vinyl chloride resin particles (a) and the vinyl chloride resin fine particles (d) is preferably at least 0.1 parts by mass and no greater than 5 parts by mass.

[Fatty Acid Metal Salt]

The presently disclosed vinyl chloride resin composition for powder molding may contain a fatty acid metal salt. The fatty acid metal salt is preferably a metal salt of a monobasic fatty acid, more preferably a metal salt of a monobasic fatty acid having a carbon number of 12 to 24, and even more preferably a metal salt of a monobasic fatty acid having a carbon number of 15 to 21. Specific examples of the fatty acid metal salt include lithium stearate, magnesium stearate, aluminum stearate, calcium stearate, strontium stearate, barium stearate, zinc stearate, calcium laurate, barium laurate, zinc laurate, barium 2-ethylhexanoate, zinc 2-ethylhexanoate, barium ricinoleate, and zinc ricinoleate. The metal in the fatty acid metal salt is preferably a metal that can produce polyvalent cations, more preferably a metal that can produce divalent cations, even more preferably a metal from periods 3 to 6 of the periodic table that can produce divalent cations, and particularly preferably a metal from period 4 of the periodic table that can produce divalent cations. The fatty acid metal salt is most preferably zinc stearate.

The content of the fatty acid metal salt relative to a total content of 100 parts by mass of the vinyl chloride resin particles (a) and the vinyl chloride resin fine particles (d) is preferably at least 0.05 parts by mass and no greater than 5 parts by mass, more preferably at least 0.1 parts by mass and no greater than 1 part by mass, and even more preferably at least 0.1 parts by mass and no greater than 0.5 parts by mass. As a result of the content of the fatty acid metal salt being within any of the ranges set forth above, the vinyl chloride resin composition for powder molding can be provided with favorable flexibility at low temperatures and a post-heat resistance test color difference value thereof can be reduced.

[Other Dusting Agents]

The presently disclosed vinyl chloride resin composition for powder molding may contain dusting agents other than the vinyl chloride resin fine particles (d) (hereinafter, also referred to as "other dusting agents"). Examples of other dusting agents that can be used include inorganic fine particles such as calcium carbonate, talc, and aluminum oxide; and organic fine particles such as polyacrylonitrile resin fine particles, poly(meth)acrylate resin fine particles, polystyrene resin fine particles, polyethylene resin fine particles, polypropylene resin fine particles, polyester resin fine particles, and polyamide resin fine particles. Among these examples, inorganic fine particles having an average particle diameter of at least 10 nm and no greater than 100 nm are preferable.

The content of such other dusting agents is not limited to a specific range. However, the content relative to a total content of 100 parts by mass of the vinyl chloride resin particles (a) and the vinyl chloride resin fine particles (d) is preferably no greater than 20 parts by mass, and more preferably no greater than 10 parts by mass.

[Other Additives]

The presently disclosed vinyl chloride resin composition for powder molding may contain other additives such as colorants, impact modifiers, perchloric acid compounds other than perchloric acid-treated hydrotalcite (for example, sodium perchlorate and potassium perchlorate), antioxidants, fungicides, flame retardants, antistatic agents, fillers, light stabilizers, foaming agents, β-diketones, and lubricants.

Specific examples of colorants include quinacridone-based pigments, perylene-based pigments, condensed polyazo pigments, isoindolinone-based pigments, copper phthalocyanine-based pigments, titanium white, and carbon black. Any one of these pigments or any two or more of these pigments may be used. A quinacridone-based pigment is obtained through concentrated sulfuric acid treatment of a p-phenylene dianthranilic acid and has a hue from yellowish red to reddish purple. Specific examples of quinacridone-based pigments include quinacridone red, quinacridone magenta, and quinacridone violet.

A perylene-based pigment is obtained through a condensation reaction of perylene-3,4,9,10-tetracarboxylic anhydride and an aromatic primary amine and has a hue from red to red-purple/brown. Specific examples of perylene-based pigments include perylene red, perylene orange, perylene maroon, perylene vermilion, and perylene bordeaux.

A condensed polyazo pigment is obtained through condensation of an azo pigment in a solvent to achieve a high molecular weight and has a hue of a yellow or red pigment. Specific examples of condensed polyazo pigments include polyazo red, polyazo yellow, chromophthal orange, chromophthal red, and chromophthal scarlet.

An isoindolinone-based pigment is obtained through a condensation reaction of 4,5,6,7-tetrachloroisoindolinone and an aromatic primary diamine and has a hue from greenish yellow to red/brown. A specific example of an isoindolinone-based pigment is isoindolinone yellow.

A copper phthalocyanine-based pigment is a pigment in which copper is coordinated with a phthalocyanine and has a hue from yellowish green to bright blue. Specific examples of copper phthalocyanine-based pigments include phthalocyanine green and phthalocyanine blue.

Titanium white is a white pigment made from titanium dioxide. Titanium white has high opacity and exists in anatase form and rutile form.

Carbon black is a black pigment having carbon as a main component and also including oxygen, hydrogen, and nitrogen. Specific examples of carbon black include thermal black, acetylene black, channel black, furnace black, lamp black, and bone black.

Specific examples of impact modifiers include an acrylonitrile-butadiene-styrene copolymer, a methyl methacrylate-butadiene-styrene copolymer, a chlorinated polyethylene, an ethylene-vinyl acetate copolymer, and a chlorosulfonated polyethylene. One impact modifier or two or more impact modifiers may be used in the presently disclosed vinyl chloride resin composition for powder molding. Note that the impact modifier is dispersed as a heterogeneous phase of fine elastic particles in the vinyl chloride resin composition for powder molding. In the presently disclosed vinyl chloride resin composition for powder molding, polar groups and chains graft polymerized with the elastic particles are compatible with the vinyl chloride resin particles (a) and improve impact resistance of the vinyl chloride resin composition for powder molding.

Specific examples of antioxidants include phenolic antioxidants, sulfuric antioxidants, and phosphoric antioxidants.

Specific examples of fungicides include aliphatic ester-based fungicides, hydrocarbon-based fungicides, organic nitrogen-based fungicides, and organic nitrogen sulfur-based fungicides.

Specific examples of flame retardants include halogen-containing flame retardants such as chlorinated paraffin; phosphoric flame retardants such as phosphoric acid esters; and inorganic hydroxides such as magnesium hydroxide and aluminum hydroxide.

Specific examples of antistatic agents include anionic antistatic agents such as fatty acid salts, higher alcohol sulfuric acid esters, and sulfonic acid salts; cationic antistatic agents such as aliphatic amine salts and quaternary ammonium salts; and non-ionic antistatic agents such as polyoxyethylene alkyl ethers and polyoxyethylene alkyl phenol ethers.

Specific examples of fillers include silica, talc, mica, calcium carbonate, and clay.

Specific examples of light stabilizers include ultraviolet absorbers based on benzotriazoles, benzophenone, and nickel chelate, and hindered amine light stabilizers.

Specific examples of foaming agents include organic foaming agents such as azo compounds (for example, azodicarbonamides and azobisisobutyronitrile), nitroso compounds (for example, N,N'-dinitrosopentamethylenetetramine), and sulfonyl hydrazide compounds (for example p-toluenesulfonyl hydrazide and p,p-oxybis(benzenesulfonyl hydrazide)); and gaseous foaming agents such as chlorofluorocarbons, carbon dioxide gas, water, and volatile hydrocarbon compounds (for example, pentane), and microcapsules containing any of these gaseous foaming agents.

A β-diketone can be used to more effectively suppress variation of initial color of a vinyl chloride resin molded product obtained through powder molding of the presently disclosed vinyl chloride resin composition for powder molding. Specific examples of β-diketones include dibenzoylmethane, stearoylbenzoylmethane, and palmitoylbenzoylmethane. Any one of these β-diketones may be used individually or any two or more of these β-diketones may be used in combination.

The content of β-diketones is not limited to a specific range. However, the content of β-diketones relative to a total content of 100 parts by mass of the vinyl chloride resin particles (a) and the vinyl chloride resin fine particles (d) is preferably at least 0.1 parts by mass and no greater than 5 parts by mass.

Specific examples of lubricants include a 12-hydroxystearic acid oligomer.

(Method for Producing Vinyl Chloride Resin Composition for Powder Molding)

The presently disclosed vinyl chloride resin composition for powder molding can be produced by mixing the components described above. In other words, a method for producing the presently disclosed vinyl chloride resin composition for powder molding includes at least mixing the vinyl chloride resin particles (a), the plasticizer (b), the fatty acid amide (c), and the vinyl chloride resin fine particles (d) such that the content of the fatty acid amide (c) is at least 0.15 parts by mass and no greater than 13 parts by mass relative to a total content of 100 parts by mass of the vinyl chloride resin particles (a) and the vinyl chloride resin fine particles (d). In the method for producing the presently disclosed vinyl chloride resin composition for powder molding, additives may optionally be mixed with the components mentioned above.

No specific limitations are placed on the method of mixing the vinyl chloride resin particles (a), the plasticizer (b), the fatty acid amide (c), the vinyl chloride resin fine particles (d), and additives that are added as necessary. In one example of a preferable mixing method, components other than plasticizers and dusting agents (inclusive of the vinyl chloride resin fine particles (d) and other dusting agents that are added as necessary) are mixed by dry blending, and then the plasticizers and the dusting agents are mixed in order. The dry blending is preferably carried out using a Henschel mixer.

(Vinyl Chloride Resin Molded Product)

The presently disclosed vinyl chloride resin molded product is obtained through powder molding (preferably powder slush molding) of the presently disclosed vinyl chloride resin composition for powder molding described above.

The presently disclosed vinyl chloride resin molded product is suitable for use as a surface skin of an automobile interior material such as an instrument panel or a door trim.

(Method for Producing Vinyl Chloride Resin Molded Product)

The presently disclosed vinyl chloride resin molded product can be produced using the vinyl chloride resin composition for powder molding described above. In other words, the presently disclosed method for producing a vinyl chloride resin molded product includes at least powder slush molding any one of the vinyl chloride resin compositions for powder molding described above or a vinyl chloride resin composition for powder molding produced according to the production method described above.

The mold temperature during powder slush molding is preferably at least 200° C. and no greater than 300° C., and more preferably at least 220° C. and no greater than 280° C.

In production of the presently disclosed vinyl chloride resin molded product, the vinyl chloride resin composition for powder molding is, for example, sprinkled onto a mold having a temperature in any of the ranges set forth above. The vinyl chloride resin composition for powder molding is initially left for at least 5 seconds and no greater than 30 seconds and, after shaking off any excess vinyl chloride resin composition, is then further left for at least 30 seconds and no greater than 3 minutes. The mold is subsequently cooled to a temperature of at least 10° C. and no greater than 60° C. and the presently disclosed vinyl chloride resin molded product obtained thereby is removed from the mold.

(Laminate)

The presently disclosed laminate is obtainable by stacking the presently disclosed vinyl chloride resin molded product and a foamed polyurethane molded product. Examples of stacking methods that can be adopted include: a method in which the vinyl chloride resin molded product and the foamed polyurethane molded product are prepared separately and are subsequently joined together by, for example, thermal fusion bonding, thermal adhesion, or using a commonly known adhesive; and a method in which raw materials of the foamed polyurethane molded product such as an isocyanate and a polyol are caused to react and polymerize on the vinyl chloride resin molded product while carrying out polyurethane foaming by a commonly known method to directly form the foamed polyurethane molded product on the vinyl chloride resin molded product. The latter of these methods is more suitable because it involves a simple process and enables laminates of various shapes to be obtained while ensuring reliable adhesion of the vinyl chloride resin molded product and the foamed polyurethane molded product.

The presently disclosed laminate is suitable for use as an automobile interior material such as an instrument panel or a door trim.

EXAMPLES

The present disclosure is described in more detail through the following examples but is not limited to these examples. Various properties were measured by the following methods.

<Melting Point of Fatty Acid Amide (c)>

The melting point of each fatty acid amide (c) used in the vinyl chloride resin compositions for powder molding of the examples and comparative examples was calculated by taking a maximum value on a melting curve measured with respect to a sample of 2 mg of the fatty acid amide using a differential scanning calorimeter (DSC) under conditions of a nitrogen atmosphere, a heating rate of 10° C./minute, and a measurement temperature range of 30° C. to 300° C.

<Average Particle Diameter of Vinyl Chloride Resin Particles (a) and Vinyl Chloride Resin Fine Particles (d)>

The average particle diameter (volume average particle diameter) of vinyl chloride resin particles (a) and vinyl chloride resin fine particles (d) used in the vinyl chloride resin compositions for powder molding of the examples and comparative examples was calculated by dispersing the vinyl chloride resin particles or vinyl chloride resin fine particles in a water tank and then using the device indicated below to measure and analyze a light diffraction-scattering intensity distribution, and thereby measure particle diameters and a volume-based particle diameter distribution.

Device: Laser diffraction particle size analyzer (model: SALD-2300, produced by Shimadzu Corporation)
Measurement method: Laser diffraction and scattering
Measurement range: 0.017 μm to 2500 μm
Light source: Semiconductor laser (wavelength 680 nm, output 3 mW)

<Average Degree of Polymerization of Vinyl Chloride Resin Particles (a) and Vinyl Chloride Resin Fine Particles (d)>

The average degree of polymerization of vinyl chloride resin particles (a) and vinyl chloride resin fine particles (d) used in the vinyl chloride resin compositions for powder molding of the examples and comparative examples was calculated by measuring the viscosity of a solution of the vinyl chloride resin particles or vinyl chloride resin fine particles dissolved in cyclohexanone in accordance with JIS K6720-2.

<Melting Temperature of Vinyl Chloride Resin Composition for Powder Molding>

The melting temperature of the vinyl chloride resin composition for powder molding obtained in each of the examples and comparative examples was measured using a heated mold. Specifically, a gradation-heated mold obtained by placing the mold on a heating plate that was gradation heated at equal intervals in a range of from 170° C. to 270° C. The vinyl chloride resin composition for powder molding was sprinkled onto the gradation-heated mold and was left for a specific time to melt. Next, excess vinyl chloride resin composition for powder molding was shaken off and the mold was cooled by water. As a result, the vinyl chloride resin for powder molding was molded into a belt-shape to form a vinyl chloride resin molded sheet that was then removed from the mold. The surface of the vinyl chloride resin molded sheet removed from the mold was inspected by eye and the temperature of a melted location was taken to be the melting temperature. The melted location was judged to be a location on the vinyl chloride resin molded sheet at which the surface was smooth without a residual particulate form. A lower melting temperature indicates that a vinyl chloride resin composition for powder molding has better meltability in heat forming. The results are shown in Tables 1 and 2.

<Post-Heat Resistance Test Adhesiveness of Vinyl Chloride Resin Composition for Powder Molding to Polyurethane>

A laminate formed by a vinyl chloride resin molded sheet lined with a foamed polyurethane molded product was placed in an oven and was heated at 130° C. for 100 hours. Thereafter, the vinyl chloride resin molded sheet was peeled from the foamed polyurethane molded product. The surface of the peeled-off vinyl chloride resin molded sheet at the side that was lined with the foamed polyurethane molded product was inspected by eye and post-heat resistance test adhesiveness of the vinyl chloride resin composition for powder molding to polyurethane was evaluated. An evaluation of "foam breakdown" was given in a situation in which a surface portion of the foamed polyurethane molded product remained over the entire surface of the inspected vinyl chloride resin molded sheet and an evaluation of "interfacial peeling" was given in a situation in which there was a location on the surface of the vinyl chloride resin molded sheet at which the surface portion of the foamed polyurethane molded product did not remain. Greater foam breakdown indicates that a vinyl chloride resin composition for powder molding has higher adhesiveness to a foamed polyurethane molded product after heat forming. The results are shown in Tables 1 and 2.

Examples 1 to 9 and Comparative Examples 1 to 4

Ingredients shown in Tables 1 and 2 with the exception of plasticizers (trimellitate plasticizer and epoxidized soybean oil) and vinyl chloride resin fine particles used as a dusting agent were added into a Henschel mixer and mixed. The plasticizers were added to the mixture after increasing the temperature of the mixture to 80° C. and the mixture was dried up (i.e., the mixture changed to a dry state through absorption of the plasticizers by vinyl chloride resin particles). Thereafter, once the dried-up mixture had been cooled to 70° C. or lower, the vinyl chloride resin fine particles used as the dusting agent were added to the mixture to yield a vinyl chloride resin composition for powder molding.

The melting temperature of the resultant vinyl chloride resin composition for powder molding was measured by the previously described method.

Next, the resultant vinyl chloride resin composition for powder molding was sprinkled onto a textured mold that was heated to 250° C. and after being left to melt for a time adjusted to give a vinyl chloride resin molded sheet thickness of 1 mm, excess vinyl chloride resin composition for powder molding was shaken off. Thereafter, the mold was placed in an oven set to 200° C., was left for 60 seconds, and was then cooled with cooling water. Once the mold had cooled to 40° C., a vinyl chloride resin molded sheet of 145 mm×175 mm×1 mm was removed from the mold.

Two obtained vinyl chloride resin molded sheets were placed in a mold of 210 mm×300 mm×10 mm such as not to overlap one another and with the textured surface underneath.

A mixed solution was separately prepared by mixing polymethylene polyphenylene polyisocyanate (polymeric MDI) with a polyol mixture in a ratio determined to give an isocyanate index of 98. The polyol mixture was composed of 50 parts by mass of a propylene glycol propylene oxide/ethylene oxide (PO/EO) block adduct (hydroxyl value 28, terminal EO unit content 10%, internal EO unit content 4%), 50 parts by mass of a glycerin PO/EO block adduct (hydroxyl value 21, terminal EO unit content 14%), 2.5 parts by mass of water, 0.2 parts by mass of an ethylene glycol solution of triethylenediamine (product name: TEDA-L33, produced by Tosoh Corporation), 1.2 parts by mass of triethanolamine, 0.5 parts by mass of triethylamine, and 0.5 parts by mass of a foam stabilizer (product name: F-122, produced by Shin-Etsu Chemical Co., Ltd.). The prepared mixed solution was poured onto each of the two vinyl chloride resin molded sheets that had been placed in the mold as described above. Thereafter, the mold was covered with a 305 mm×395 mm×20 mm aluminum plate to seal the mold. After the mold had been sealed for 5 minutes, a laminate of a surface skin formed by the vinyl chloride resin molded sheet having a thickness of 1 mm and lined with a foamed polyurethane molded product having a thickness of 9 mm and a density of 0.18 g/cm$^3$ was removed from the mold, and was used to measure post-heat resistance test adhesiveness to polyurethane by the previously described method. The results are shown in Tables 1 and 2.

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| Composition (parts by mass) | Vinyl chloride resin particles[1] | 100.0 | 100.0 | 100.0 | 100.0 | 100.0 | 100.0 | 100.0 | 100.0 | 100.0 |
| | Trimellitate plasticizer[2] | 115.0 | 115.0 | 115.0 | 115.0 | 115.0 | 115.0 | 115.0 | 115.0 | 115.0 |
| | Epoxidized soybean oil[3] | 5.0 | 5.0 | 5.0 | 5.0 | 5.0 | 5.0 | 5.0 | 5.0 | 5.0 |
| | Perchloric acid-treated hydrotalcite[4] | 5.0 | 5.0 | 5.0 | 5.0 | 5.0 | 5.0 | 5.0 | 5.0 | 5.0 |
| | Zeolite[5] | 2.5 | 2.5 | 2.5 | 2.5 | 2.5 | 2.5 | 2.5 | 2.5 | 2.5 |
| | Stearoylbenzoyl methane[6] | 0.5 | 0.5 | 0.5 | 0.5 | 0.5 | 0.5 | 0.5 | 0.5 | 0.5 |
| | Zinc stearate[7] | 0.2 | 0.2 | 0.2 | 0.2 | 0.2 | 0.2 | 0.2 | 0.2 | 0.2 |
| | 12-Hydroxystearic acid oligomer[8] | 0.4 | 0.4 | 0.4 | 0.4 | 0.4 | 0.4 | 0.4 | 0.4 | 0.4 |
| | Ethylene bisstearamide A (fatty acid amide)[9] | 1.0 | 3.0 | 5.0 | 10.0 | — | — | — | — | — |
| | Ethylene bisstearamide B (fatty acid amide)[10] | — | — | — | — | 3.0 | — | — | — | — |
| | Fatty acid amide[11] | — | — | — | — | — | 0.2 | 1.0 | 5.0 | 10.0 |
| | Stearamide (fatty acid amide)[12] | — | — | — | — | — | — | — | — | — |
| | Dusting agent (vinyl chloride resin fine particles)[13] | 20.0 | 20.0 | 20.0 | 20.0 | 20.0 | 20.0 | 20.0 | 20.0 | 20.0 |
| | Pigment[14] | 3.0 | 3.0 | 3.0 | 3.0 | 3.0 | 3.0 | 3.0 | 3.0 | 3.0 |
| Post-heat resistance test adhesiveness to polyurethane | | Foam breakdown | Foam breakdown | Foam breakdown | Foam breakdown | Foam breakdown | Foam breakdown | Foam breakdown | Foam breakdown | Foam breakdown |
| Melting temperature (° C.) | | 232 | 231 | 228 | 226 | 233 | 232 | 230 | 228 | 227 |

TABLE 2

| | | Comparative Example 1 | Comparative Example 2 | Comparative Example 3 | Comparative Example 4 |
|---|---|---|---|---|---|
| Composition (parts by mass) | Vinyl chloride resin particles[1] | 100.0 | 100.0 | 100.0 | 100.0 |
| | Trimellitate plasticizer[2] | 115.0 | 115.0 | 115.0 | 115.0 |
| | Epoxidized soybean oil[3] | 5.0 | 5.0 | 5.0 | 5.0 |
| | Perchloric acid-treated hydrotalcite[4] | 5.0 | 5.0 | 5.0 | 5.0 |
| | Zeolite[5] | 2.5 | 2.5 | 2.5 | 2.5 |
| | Stearoylbenzoylmethane[6] | 0.5 | 0.5 | 0.5 | 0.5 |
| | Zinc stearate[7] | 0.2 | 0.2 | 0.2 | 0.2 |
| | 12-Hydroxystearic acid oligomer[8] | 0.4 | 0.4 | 0.4 | 0.4 |
| | Ethylene bisstearamide A (fatty acid amide)[9] | — | 20.0 | — | — |
| | Ethylene bisstearamide B (fatty acid amide)[10] | — | — | — | — |

TABLE 2-continued

|  | Comparative Example 1 | Comparative Example 2 | Comparative Example 3 | Comparative Example 4 |
|---|---|---|---|---|
| Fatty acid amide[11] | — | — | 20.0 | — |
| Stearamide (fatty acid amide)[12] | — | — | — | 3.0 |
| Dusting agent (vinyl chloride resin fine particles)[13] | 20.0 | 20.0 | 20.0 | 20.0 |
| Pigment[14] | 3.0 | 3.0 | 3.0 | 3.0 |
| Post-heat resistance test adhesiveness to polyurethane | Foam breakdown | Interfacial peeling | Interfacial peeling | Interfacial peeling |
| Melting temperature (° C.) | 237 | 225 | 224 | 228 |

[1] ZEST 2000Z (vinyl chloride resin particles (a), average degree of polymerization 2,000, average particle diameter 130 μm) produced by Shin Dai-ichi Vinyl Corporation
[2] TRIMEX N-08 produced by Kao Corporation
[3] ADK CIZER O-130S produced by ADEKA Corporation
[4] ALCAMIZER 5 produced by Kyowa Chemical Industry Co., Ltd.
[5] MIZUKALIZER DS produced by Mizusawa Industrial Chemicals, Ltd.
[6] Karenz DK-1 produced by Showa Denko K.K.
[7] SAKAI SZ2000 produced by Sakai Chemical Industry Co., Ltd.
[8] ADK STAB LS-12 produced by ADEKA Corporation
[9] SLIPACKS EK (melting point 145° C., average particle diameter 3 μm) produced by Nippon Kasei Chemical Co., Ltd.
[10] SLIPACKS E fine powder (melting point 145° C., average particle diameter 15 μm) produced by Nippon Kasei Chemical Co., Ltd.
[11] CERAFLOUR 960 (melting point 145° C., average particle diameter 4 μm) produced by BYK Japan KK
[12] AMIDE AP-1 fine powder (melting point 101° C., average particle diameter 20 μm) produced by Nippon Kasei Chemical Co., Ltd.
[13] ZEST PQLTX (vinyl chloride resin fine particles (d), average degree of polymerization 800, average particle diameter 2 μm) produced by Shin Dai-ichi Vinyl Corporation
[14] DA PX-1720 Black (A) produced by Dainichiseika Color and Chemicals Mfg. Co., Ltd.

The vinyl chloride resin compositions for powder molding in Examples 1 to 9 each had excellent meltability in heat forming and high adhesiveness to a foamed polyurethane molded product after heat forming. The vinyl chloride resin composition for powder molding in Comparative Example 1, which did not contain a fatty acid amide, had low meltability in heat forming. The vinyl chloride resin compositions for powder molding in Comparative Examples 2 and 3, which each had an excessively high content of a fatty acid amide having a melting point of at least 105° C., had low post-heat resistance test adhesiveness to polyurethane. The vinyl chloride resin composition for powder molding in Comparative Example 4, which contained a fatty acid amide having a melting point of lower than 105° C. instead of a fatty acid amide having a melting point of at least 105° C., had low post-heat resistance test adhesiveness to polyurethane.

INDUSTRIAL APPLICABILITY

The presently disclosed vinyl chloride resin composition for powder molding is suitable as, for example, a molding material for a surface skin of an automobile interior material such as an instrument panel or a door trim.

The invention claimed is:

1. A vinyl chloride resin composition for powder molding comprising
vinyl chloride resin particles (a), a plasticizer (b), a fatty acid amide (c), and vinyl chloride resin fine particles (d), wherein
the fatty acid amide (c) has a melting point of at least 105° C. and a content of at least 4.1 parts by mass and no greater than 10 parts by mass relative to a total content of 100 parts by mass of the vinyl chloride resin particles (a) and the vinyl chloride resin fine particles (d),
the fatty acid amide (c) has an average particle diameter of at least 0.1 μm and less than 20 μm.

2. The vinyl chloride resin composition for powder molding of claim 1, wherein
the fatty acid amide (c) has a dimer or higher structure.

3. The vinyl chloride resin composition for powder molding of claim 1, wherein
the vinyl chloride resin particles (a) have an average particle diameter of at least 50 μm and no greater than 500 μm.

4. The vinyl chloride resin composition for powder molding of claim 1, wherein
the vinyl chloride resin fine particles (d) have an average particle diameter of at least 0.1 μm and no greater than 10 μm.

5. A vinyl chloride resin molded product obtained through powder slush molding of the vinyl chloride resin composition for powder molding of claim 1.

6. The vinyl chloride resin molded product of claim 5 for a surface skin of an automobile instrument panel.

7. A laminate comprising:
a foamed polyurethane molded product; and
the vinyl chloride resin molded product of claim 5.

8. The laminate of claim 7 for an automobile instrument panel.

9. A method for producing the vinyl chloride resin composition for powder molding of claim 1, comprising
mixing the vinyl chloride resin particles (a), the plasticizer (b), the fatty acid amide (c), and the vinyl chloride resin fine particles (d).

10. A method for producing a vinyl chloride resin molded product comprising
powder slush molding the vinyl chloride resin composition for powder molding of claim 1.

11. The vinyl chloride resin composition for powder molding of claim 1, further comprising a β-diketone, wherein a content of the β-diketones relative to a total content of 100 parts by mass of the vinyl chloride resin particles (a) and the vinyl chloride resin fine particles (d) is at least 0.1 parts by mass and no greater than 5 parts by mass.

12. The vinyl chloride resin composition for powder molding of claim 1, wherein the fatty acid amide (c) has the content of at least 4.1 parts by mass and no greater than 8.3 parts by mass relative to a total content of 100 parts by mass of the vinyl chloride resin particles (a) and the vinyl chloride resin fine particles (d).

* * * * *